3,444,123
EPISULPHIDE POLYMERS CROSS-LINKED
WITH AMINOPLAST RESINS
Reginald D. Singer, Hollywood, Birmingham, and John L. Smith, Coleshill, England, assignors to Dunlop Rubber Company Limited, London, England, a British company
No Drawing. Filed June 28, 1966, Ser. No. 561,069
Claims priority, application Great Britain, July 20, 1965, 30,729/65
Int. Cl. C08g 37/32
U.S. Cl. 260—33.4
19 Claims

ABSTRACT OF THE DISCLOSURE

An episulphide homopolymer or a copolymer of episulphide monomers is mixed with a potentially thermosetting organic aminoplast. The composition may be heated, for example, to about 140–180° C. to effect reaction between the episulphide polymer and the aminoplast, preferably in the presence of an acid catalyst.

---

This invention relates to polymer compositions and particularly to polymer compositions comprising crosslinked polymers of one or more episulphides, and to a process for the preparation of such compositions.

According to the present invention a polymer composition comprises the reaction product of a polymer of one or more episulphides having at least two reactive terminal groups and a potentially thermosetting organic aminoplast.

According to the present invention also, a process for the preparation of a polymer composition comprises mixing a polymer of one or more episulphides having at least two reactive terminal groups with a potentially thermosetting organic aminoplast and allowing said polymer to react with said aminoplast to form the polymer composition.

The reaction between the polymer of one or more episulphides and the potentially thermosetting aminoplast can be carried out in the presence of a catalyst to accelerate the reaction, and examples of suitable catalysts are para-toluene sulphonic acid and acid butyl phosphates. The catalyst is usually used in the form of an acidic solution. The amount of the catalyst is not critical but will usually be from 0.1 part to 2.0 parts by weight per 100 parts by weight of the aminoplast.

The polymer of one or more episulphides has at least two reactive terminal groups which may be, for instance, thiol groups, hydroxy groups, amino groups or epoxy groups. A method for the preparation of suitable polymers comprises polymerizing one or more episulphides in the presence of a polymerization catalyst being a compound of a metal of the B sub-Group of Group II of the Mendeleeff Periodic Table and a cocatalyst being ammonia, an inorganic ammonium compound, an organic amine, hydrazine or a derivative of hydrazine. The resulting polymer has a terminal —SH group and another reactive terminal group which will usually be an amino group.

The polymer of one or more episulphides can have a molecular weight of greater than 10,000, but it is preferred to use a polymer having a molecular weight of less than 10,000 and particularly useful polymers are those having a molecular weight of less than 3,500. The polymer will usually be a liquid of low viscosity, but polymers of high viscosity or even solid polymers can be used in the form of a solution in an organic solvent therefor. Suitable organic solvents are hydrocarbons such as benzene and toluene, chlorinated hydrocarbons such as chlorobenzene and chloroform, and carbon tetrachloride. The amount of the solvent is not critical and amounts of up to 300 parts by weight per 100 parts of the polymer can be used. It may in certain cases be advantageous to use the composition in the presence of a solvent to produce a polymer composition which has a low viscosity and which can be painted or sprayed on to a surface to form a protective coating on the surface. The viscosity of such a polymer composition can readily be adjusted by adding solvent to, or removing solvent from the composition, as desired.

The organic aminoplast can be any of the known potentially thermosetting aminoplasts, and examples of suitable aminoplasts are the condensation products of amino compounds with formaldehyde and, if desired, with epoxides. Typical amino compounds which can be used to form the resins are urea, ethylene urea and aminotriazines such as melamine and benzoguanamine.

The aminoplasts which may be used are potentially thermosetting, i.e. they can be cross-linked and caused to set by heating them, and are preferably used in solution. The amount of the aminoplast used is not critical, but will usually be from 0.5 part to 5.0 parts by weight per part of the polymer of one or more episulphides.

The mixing of the polymer of one or more episulphides and the potentially thermosetting aminoplast is usually carried out at room temperature, and it is preferred to use the composition at room temperature and subsequently heat the composition to an elevated temperature, for instance from 140° C. to 180° C. to effect final cross-linkage of the composition.

The polymer compositions of the invention can be used to provide protective coatings to articles of metal, wood, textiles, paper and a variety of other articles. The compositions can be spread, painted or sprayed on to the surface to be coated, and allowed to dry to form the protective coating. As hereinbefore explained, it is preferred to heat the composition to about 160° C. to effect final cross-linkage thereof.

The polymer compositions can also be used as adhesive compositions, in which case the composition is applied between the surfaces to be adhered together, for instance both of the surfaces can be be coated and the coated surfaces pressed into contact. The composition is then dried and, preferably, heated to about 160° C.

The invention is illustrated by the following examples, in which all "Parts" are parts by weight.

Example I 1.0 part of liquid poly(propylene episulphide) having a molecular weight of 1040 and having one terminal thiol group and one terminal amino group, was mixed with 2.0 parts by dry weight of a butylated melamine/formaldehyde resin available under the trade name BE. 628 as a 65 percent solution in n-butanol and 0.1 part of an acid catalyst. The catalyst was a solution of acid butyl phosphate in n-butanol available under the trade name AC. 64.

The composition was sprayed on to the surface of a mild-steel panel, to form a film of the composition on the surface of the panel. The coated panel was dried and then heated at 160° C. for 30 minutes in an air oven.

The resulting film was hard and glossy and had good adhesion to the mild-steel panel. The film was sprayed for 14 days with a 5 percent aqueous solution of sodium chloride and showed no visible change in appearance after this time. The film was also immersed in 5 percent aqueous sodium hydroxide solution for 100 hours and showed no change in properties or appearance after this time.

The above procedure was repeated but using a butylated urea/formaldehyde resin available under the trade name BE. 640 instead of the butylated melamine/formaldehyde resin. The resulting film had similar properties to the film obtained using the butylated melamine/formaldehyde resin.

The procedure was again repeated, but using 2.0 parts dry weight of a butylated benzoguanamine/formaldehyde resin available under the trade name BE. 659 as a 70 percent solution in n-butanol instead of the butylated melamine/formaldehyde resin. The resulting film had properties similar to those of the film obtained using the butylated melamine/formaldehyde resin, but had greater flexibility.

Example II 2.0 parts of the liquid poly(propylene episulphide) as in Example I were mixed with 3.0 parts dry weight of a butylated benzoguanamine/formaldehyde resin available under the trade name BE. 659, and 0.15 part of the catalyst AC. 64. The composition was sprayed on to the surface of a mild-steel panel and the coated panel after air-drying was heated at 160° C. for 30 minutes. The resulting film had properties similar to those of the film obtained from the same resin in Example I, but had even greater flexibility.

Example III

This example illustrates the use of an aminoplast derived from an epoxide compound.

The procedure outline in Example I was repeated except that the butylated melamine/formaldehyde resin was replaced by 2.0 parts dry weight of a melamine/epoxide copolymer resin available under the trade name BE. 649 as a 60 percent solution in a 1:2 xylol:butanol mixture. The resulting film had good impact resistance, and good resistance to salt-spray and to sodium hydroxide solution.

Example IV 1.0 part of poly(propylene episulphide) having a molecular weight of 1810 and having one terminal thiol group and one terminal amino group was mixed with 3.0 parts dry weight of a butylated benzoguanamine/formaldehyde resin available under the trade name BE. 659, and 0.15 part of the catalyst AC. 64. The composition was sprayed on to a mild-steel panel and the resulting film after air-drying was heated at 160° C. for 30 minutes.

The product was a hard, glossy film having good impact resistance and good resistance to salt-spray and to sodium hydroxide solution.

Similar results were obtained when the experiment was repeated using 4 parts of the resin.

The above procedure was repeated using 1.0 part of poly(propylene episulphide) of molecular weight 3,000, 2.0 parts dry weight of the resin and 0.1 part of the catalyst. The film after air-drying was heated at 160° C. for 30 minutes and 120 minutes, and the hardness of the film was determined after each of these times. After heating for 30 minutes the film had a hardness (pencil) of HB, and after 120 minutes the hardness (pencil) was from H to 2H.

Example V 1.0 part of a terpolymer of propylene episulphide (20 parts) allyl thioglycidyl ether (4 parts) and 1-hexene episulphide (5 parts) having a molecular weight of 2,000 was mixed with 2.0 parts dry weight of a butylated benzoguanamine/formaldehyde resin available under the trade name BE. 659 as a 70 percent solution in butanol, and with 0.1 part of the catalyst AC. 64. The mixture (Composition A) was sprayed on to the surface of a mild-steel panel and was air-dried and then heated to 160° C. for 30 minutes in an air-oven.

The following properties of the cured film were determined:

Pencil hardness

Flexibility test—The film was bent around a ⅛ inch diameter steel mandrel. To pass the test the film must show no signs of flaking or cracking.

سodium hydroxide test—The film was immersed in a 5 percent aqueous solution of sodium hydroxide for 48 hours, and was then examined.

Impact resistance—The test used is described in "Defense Specification DEF/1053, Sept. 26, 1952, as amended Dec. 10, 1959, method 17(a)".

The results are shown below.

The above procedure was then repeated using a different Composition (B) prepared as described for Composition A except that the terpolymer used contained cyclohexene episulphide (5 parts) instead of 1-hexene episulphide.

The results of the tests are shown below:

| Test | Composition A | Composition B |
| --- | --- | --- |
| Pencil hardness | H | H. |
| Flexibility | Pass | Pass. |
| Sodium hydroxide | No effect | No effect. |
| Impact resistance | Satisfactory | Satisfactory. |

Example VI

A polymer of propylene episulphide having amine and thiol end groups was treated at room temperature with successive small additions (about 1.0 ml.) of ethylene imine, whilst stirring vigorously. Periodically, a sample was extracted and treated with sodium nitroprusside. This was continued until no purple coloration was obtained in the nitroprusside test indicating that thiol groups were no longer present in the polymer. Examination of the polymer by infra-red spectroscopy indicated that substantially all the end-groups were of the amino type.

5 parts by weight of this amino-tipped polymer were blended with an equal dry weight of the commercially-available butylated benzoguanamine resin, BE. 659 (7.15 parts of the 70 percent solution in n-butanol). To this blend were added 0.25 part of a 20 percent solution of p-toluene sulphonic acid in a 50/50 butanol/xylene mixture and 1.0 part of a 10 percent solution in methylethyl ketone of cellulose acetate butyrate. This blend was then diluted with toluene to give a 50 percent w./w. solution.

Panels were coated in the usual manner and after air drying and stoving at 160° C. for 30 minutes were tested with the following results:

Pencil hardness—4H
Flexibility—Pass ⅛ inch
Impact resistance—Pass full indentation
5 percent sodium hydroxide—Unaffected after 7 days
5 percent salt spray exposure (14 days)—Very little rust creep (less than ¹⁄₁₆ inch). No general corrosion.

Example VII

This was carried out as Example VI except that the benzoguanamine resin was replaced by an equal dry weight of the melamine/epoxide copolymers available under the trade name BE. 649 (8.34 parts of the 60 percent solution were used). The test results on the stoved coatings were as follows:

Pencil hardness—2H
Flexibility—Pass ⅛ inch
Impact resistance—Pass full indentation
5 percent sodium hydroxide—Unaffected after 48 hours
5 percent salt spray exposure (14 days)—No attack Example VIII Ethlyene oxide was slowly bubbled through a stirred sample of an amino-thiol tipped poly(propylene episulphide) at room temperature. Periodically, a sample was extracted and tested with sodium nitroprusside for the presence of thiol groups as in Example VI. After about 6 hours this test indicated that thiol groups were no longer present. Examination of the polymer by infra-red spectroscopy indicated that the polymer had only hydroxyl end groups with virtually no amino or thiol end groups. 10 parts of this polymer were blended with 20 parts of the melamine/epoxide copolymer (BE. 649) used in Example VII (33.3 parts of the 60 percent solution were used), 1.0 part of the 20 percent solution of p-toluene sulphonic acid and 30 parts of a 10 percent solution of cellulose acetate butyrate. This blend was diluted to 50 percent solids content with xylene. After air drying and stoving for 30 minutes at 160° C. prepared panels were tested with the following results:

Pencil hardness—H
Flexibility—Pass ⅛ inch
Impact resistance—Pass half indentation
5 percent sodium hydroxide—Unaffected after 92 hours
5 percent salt spray exposure (14 days)—Slight rust creep up to 1/16 inch in places. General condition excellent.

Example IX

This example was carried out as Example VIII except that the melamine/epoxide copolymer was replaced by an equal dry weight of the benzoguanamine resin BE. 659 (28.6 parts of the 70 percent solution were used) and dilution to 50 percent solids was with toluene. The test results were as follows:

Pencil hardness—3H
Flexibility—Pass ⅜ inch
Impact resistance—Fail ¼ indentation
5 percent sodium hydroxide—Unaffected after 16 hours
5 percent salt spray exposure (14 days)—Slight rust creep up to 1/16 inch. General condition very good.

Example X

A white paint was prepared by mixing the following ingredients:

| | Parts |
|---|---|
| Poly(propylene episulphide) (mol. wt. 600) | 20 |
| BE. 659 (70 percent solution) | 43.0 |
| p-Toulene sulphonic acid (20 percent solution) | 1.5 |
| Cellulose acetate butyrate (10 percent solution) | 6.4 |
| Rutile titanium dioxide | 50.0 |
| Toluene | 30.0 |

The poly(propylene episulphide) contained one amino and one thiol end group per molecule. This blend was passed three times through a triple roll mill to give a smooth, creamy product which was then diluted with toluene to a suitable viscosity for spraying. Mild-steel panels were sprayed with the coating composition and, after air-drying, stoved for 30 minutes at 160° C. The resultant coatings were white, smooth and hard with excellent resistance to 5 percent caustic soda solution and salt-spray.

Having now described our invention, what we claim is:

1. A polymer composition which comprises a mixture of an episulphide polymer having at least two reactive terminal groups selected from the group consisting of an episulphide homopolymer and a copolymer of episulphide monomers, and a potentially thermosetting organic aminoplast, the amount of said aminoplast being sufficient to effect cross-linking of the polymer composition.

2. A polymer composition according to claim 1 in which the terminal groups are selected from the class consisting of thiol groups, hydroxy groups, amino groups and epoxy groups.

3. A polymer composition according to claim 1 in which the episulphide polymer has a molecular weight less than 10,000.

4. A polymer composition according to claim 3 in which the episulphide polymer has a molecular weight of less than 3,500.

5. A polymer composition according to claim 1 in which the amount of the organic aminoplast is from 0.5 part to 5 parts by weight per part of the polymer.

6. A polymer composition according to claim 1, wherein the episulphide polymer consists essentially of a polymer of at least one episulphide monomer selected from the group consisting of propylene episulphide, allyl thioglycidyl ether, 1-hexene episulphide, and cyclohexene episulphide.

7. A process for the preparation of a polymer composition which comprises mixing an episulphide polymer having at least two reactive terminal groups with an amount of a potentially thermosetting aminoplast sufficient to effect cross-linking of the polymer composition, said episulphide polymer being selected from the group consisting of an episulphide homopolymer and a copolymer of episulphide monomers, and reacting said episulphide polymer with said aminoplast to form the polymer composition in the presence of an acid catalyst.

8. A process according to claim 7, in which the amount of the aminoplast is from 0.5 part to 5 parts by weight per part of the polymer.

9. A process according to claim 8 in which the catalyst is selected from the group consisting of an acid butyl phosphate and p-toluene sulphonic acid.

10. A process according to claim 8 in which the catalyst is present in an amount of from 0.1 part to 2 parts by weight per 100 parts by weight of the organic aminoplast.

11. A process according to claim 7 in which the episulphide polymer has at least one reactive group selected from the class consisting of thiol groups, hydroxy groups, amino groups and epoxy groups.

12. A process according to claim 11 in which the episulphide polymer has a molecular weight of less than 10,000.

13. A process according to claim 12 in which the episulphide polymer has a molecular weight of less than 3,500.

14. A process according to claim 7 in which the reaction is carried out in the presence of a solvent for the episulphide polymer.

15. A process according to claim 14 in which the amount of the solvent is up to 300 parts by weight per 100 parts of the episulphide polymer.

16. A process according to claim 7 in which the organic aminoplast is a condensation product of an amino compound with formaldehyde.

17. A process according to claim 7 in which the amount of the organic aminoplast is from 0.5 part to 5 parts by weight per part of the episulphide polymer.

18. A process according to claim 7 in which the episulphide polymer and the organic aminoplast are mixed at room temperature.

19. A process according to claim 18 in which the mixture is heated to a temperature of from 140° C. to 180° C. to effect reaction between the episulphide polymer and the organic aminoplast.

References Cited

UNITED STATES PATENTS 2,985,610  5/1961  Blanchette et al. _____ 260—72
3,301,796  1/1967  Herold _____ 260—33.4

MORRIS LIEBMAN, *Primary Examiner.*

L. T. JACOBS, *Assistant Examiner.*

U.S. Cl. X.R.
260—33.6, 849